United States Patent
Habu

(10) Patent No.: US 11,724,662 B2
(45) Date of Patent: Aug. 15, 2023

(54) AIRBAG DEVICE

(71) Applicant: Autoliv Development AB, Vargarda (SE)

(72) Inventor: Masaru Habu, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 87 days.

(21) Appl. No.: 17/310,767

(22) PCT Filed: Jan. 9, 2020

(86) PCT No.: PCT/JP2020/000537
§ 371 (c)(1),
(2) Date: Aug. 23, 2021

(87) PCT Pub. No.: WO2020/174892
PCT Pub. Date: Sep. 3, 2020

(65) Prior Publication Data
US 2022/0126778 A1  Apr. 28, 2022

(30) Foreign Application Priority Data

Feb. 27, 2019 (JP) ................................ 2019-034939

(51) Int. Cl.
*B60R 21/2338* (2011.01)
*B60R 21/205* (2011.01)
*B60R 21/00* (2006.01)

(52) U.S. Cl.
CPC ........ *B60R 21/2338* (2013.01); *B60R 21/205* (2013.01); *B60R 2021/0048* (2013.01); *B60R 2021/23382* (2013.01)

(58) Field of Classification Search
CPC .............. B60R 21/2338; B60R 21/205; B60R 2021/23382; B60R 2021/23308
See application file for complete search history.

(56) References Cited

U.S. PATENT DOCUMENTS 10,926,731 B2 * 2/2021 Nakajima ............. B60R 21/233
10,926,734 B2 * 2/2021 Yamada ................ B60R 21/233
(Continued)

FOREIGN PATENT DOCUMENTS

JP    2013-14176 A    1/2013
JP    2018-158638 A   10/2018
(Continued)

OTHER PUBLICATIONS

Computer generated English translation of WO 2018/069407 (2023) (Year: 2023).*
(Continued)

*Primary Examiner* — Drew J Brown
*Assistant Examiner* — Tiffany L Webb
(74) *Attorney, Agent, or Firm* — Foley & Lardner, LLP

(57) ABSTRACT

The present invention is an airbag device that is housed in the instrument panel of a vehicle and includes an inflator for generating inflation gas and an airbag that inflates and deploys toward the occupant side via gas released from the inflator. The airbag has a front protection part located in front of the occupant when deployed and a pair of side protruding parts located on the sides of the front protection part in the vehicle width direction and protruding further toward the occupant side than the front protection part. Furthermore, a cross tether extending in the direction intersecting the deployment direction of the airbag and connected to the inner surface of the airbag along with a pair of first front-rear tethers connected to the cross tether at the front ends thereof and connected to the front protection part at the rear ends thereof are provided inside the airbag.

20 Claims, 11 Drawing Sheets

(56) References Cited

U.S. PATENT DOCUMENTS

| | | | |
|---|---|---|---|
| 11,007,967 B2 * | 5/2021 | Zink | B60R 21/233 |
| 11,167,717 B2 * | 11/2021 | Nakajima | B60R 21/2338 |
| 11,180,108 B2 * | 11/2021 | Nonoyama | B60R 21/203 |
| 2017/0253212 A1 | 9/2017 | Choi et al. | |
| 2018/0126946 A1 | 5/2018 | Bausch et al. | |
| 2019/0193671 A1 * | 6/2019 | Hotta | B60R 21/216 |

FOREIGN PATENT DOCUMENTS

| | | | |
|---|---|---|---|
| WO | 2018/069407 A1 | 4/2018 | |
| WO | WO-2018069407 A1 * | 4/2018 | B60R 21/231 |
| WO | 2018/198443 A1 | 11/2018 | |
| WO | WO-2018198443 A1 * | 11/2018 | B60R 21/205 |

OTHER PUBLICATIONS

Computer generated English translation of WO 2018/198443 (2023) (Year: 2023).*

* cited by examiner (Deployment direction)

AIRBAG DEVICE

TECHNICAL FIELD

The present invention relates to an airbag device for protecting an occupant riding in a passenger seat of a vehicle.

BACKGROUND TECHNOLOGY

The provision of a vehicle with one or more kinds of airbags in order to protect an occupant in the event of a vehicle accident is well known. There are various forms of airbags, including, for example, a so-called driver airbag that deploys from the vicinity of the center of the steering wheel of an automobile in order to protect a driver, an occupant airbag that deploys from the instrument panel in order to protect an occupant in a passenger seat, a curtain airbag that deploys downward inside a window of the automobile in order to protect the occupant in the event of an impact in the vehicle lateral direction or an overturn or rollover accident, and a side airbag that deploys from the side of the seat in order to protect the occupant in the event of an impact in the vehicle lateral direction. The present invention relates to an airbag device for a passenger seat.

Incidentally, in the event of a so-called oblique collision in which an impact is exerted on a vehicle from the diagonal front direction, an occupant may approach (contact) a deployed airbag at an irregular angle, causing the head of the occupant to turn. A structure has been proposed that prevents the turning of the head of an occupant in order to prevent an increase in the injury value due to the turning of the head of the occupant.

For example, in the airbag device described in the following Patent Document 1, a portion that swells out toward the occupant side is provided on both the left and right sides of an airbag to prevent the head of an occupant from turning. However, the device described in Patent Document 1 may potentially not be able to sufficiently prevent the head of an occupant from turning.

PRIOR ART DOCUMENTS

Patent Documents

Patent Document 1: Japanese Unexamined Patent Application Publication No. 2013-14176

SUMMARY OF THE INVENTION

Problem to be Solved by the Invention

The present invention has been created in view of the above circumstances, and an object thereof is to provide an airbag device that can effectively prevent the turning of the head of an occupant riding in a passenger seat of a vehicle.

Means for Solving the Problems

While the means for solving the abovementioned problem is described below, in the specification, claims, and drawings of the present application, "front" refers to the front (in the traveling direction) of a vehicle, "rear" refers to the rear (opposite the traveling direction) of the vehicle, "right" refers to the right side in the traveling direction, "left" refers to the left side in the traveling direction, and "vehicle width direction" refers to the left-right direction.

In order to solve the abovementioned problem, the present invention is an airbag device that is housed in the instrument panel of a vehicle in order to protect an occupant in a passenger seat and includes an inflator for generating inflation gas, and an airbag that inflates and deploys toward the occupant side via gas released from the inflator. The airbag has a front protection part located in front of the occupant when deployed and a pair of side protruding parts located on the sides of the front protection part in the vehicle width direction and protruding further toward the occupant side than the front protection part. Furthermore, a cross tether extending in the direction intersecting the deployment direction of the airbag and connected to the inner surface of the airbag along with a pair of first front-rear tethers connected to the cross tether at the front ends thereof and connected to the front protection part at the rear ends thereof are provided inside the airbag. Here, the "direction intersecting" means the direction that is not parallel and can be the direction generally close to vertical.

As described above, in the present invention, a structure is employed that connects the front-rear tethers to the cross tether; therefore, tension is applied to the front-rear tethers by inflation gas when the airbag deploys, while the front protection part is attracted toward the vehicle front (inflator side) at the connections with the front-rear tethers. This causes the connections with the front-rear tethers to be recessed when viewed from the occupant side, with a protrusion formed between the recessed portions. This protrusion can soften the surface of the front protection part and gently receive the head of the occupant, consequently mitigating the impact on the head of the occupant and preventing the turning of the head of the occupant. Thereafter, when the inflation gas spreads throughout the entire airbag, the tension in the front-rear direction of the front-rear tethers decreases, while the tension of the front protection part increases. At this time, since the front-rear tethers are connected to the cross tether, the front-rear tethers are drawn frontward by the cross tether and a time difference occurs until the protrusion formed between the front-rear tethers fully extends in the width direction, extending the time to maintain the shape of the protrusion, although in a short period of time. In other words, compared to the case in which the front ends of the front-rear tethers are connected directly to the inner surface of the airbag, a slight time delay occurs until the tension of the front protection part reaches the maximum after the tension of the front-rear tethers has decreased, extending the time for the front protection part to maintain a flexible state.

Connections between the rear end of the first front-rear tethers and the front protection part may be structured so as to be located at the boundaries between the front protection part and the side protruding parts. This also causes the airbag (the front protection part) to be pulled frontward by the first front-rear tethers, allowing the side protruding parts to clearly protrude relative to the front protection part.

The portion between connections of the cross tether with the pair of first front-rear tethers may be configured so as to move further in the occupant direction by a predetermined distance than a straight line connecting the portions at which the both ends of the cross tether are connected to the inner surface of the airbag when the airbag deploys. The cross tether that has moved in the occupant direction during the deployment of the airbag subsequently exhibits a behavior of returning frontward as a reaction. Consequently, while the airbag is deploying in the left-right width direction, a long distance can be ensured for the front-rear tethers to be drawn frontward by the cross tether, enabling further lengthening of the time in which the shape of the protrusion formed between the front-rear tethers is maintained.

In a state of maximum tension of the first front-rear tethers, the angle θ between the direction in which the first front-rear tethers extend and the direction in which the cross tether extends from the connections between the cross tether and the first front-rear tethers toward the connections with the inner surface of the air bag can be configured so as to be less than or equal to 45°. Specifically, the angle θ is preferably 20 to 40°.

The angle θ as described above can be matched with the angle in the event of an oblique collision (the angle at which the occupant approaches the airbag), and by optimally setting this angle θ, the range (margin) in which the airbag extends in the width direction can be ensured to be large when the occupant obliquely approaches the front protection part (and the side protruding parts).

The cross tether can be disposed so as to cover a portion of the instrument panel when the inside of the airbag deployed is viewed from the occupant side in the extending direction of the first front-rear tethers. Furthermore, the cross tether can be configured so as to be convex toward the occupant side when the inside of the airbag deployed is viewed from the side.

The cross tether can be formed into a letter H shape with the vehicle width direction as the lateral direction, or can be formed into a rectangular shape when viewed from the occupant side in the extending direction of the first front-rear tethers. By devising the shape of the cross tether, it is possible to cause the cross tether to function as a diffuser or a flow straightening member for regulating the flow of inflation gas.

It is preferable to employ a configuration involving providing a pair of second front-rear tethers inside in the vehicle width direction of the pair of first front-rear tethers, connecting the front ends of the second front-rear tethers to the cross tether, and connecting the rear ends thereof to the front protection part. Furthermore, the front protection part located between the pair of side protruding parts can be configured such that a pair of left and right intermediate protruding parts protruding toward the occupant side are formed between the first front-rear tethers and the second front-rear tethers, with a central protruding part protruding toward the occupant side formed between the pair of second front-rear tethers.

As described above, by providing a pair of second front-rear tethers in addition to the pair of first front-rear tethers, a plurality (three) of protrusions having a small curvature radius are formed in the front protection part, allowing the flexibility (cushioning) of the front protection part to be further improved.

Note that the central protruding part can be structured so as to protrude further toward the occupant side than the intermediate protruding parts.

The curvature radius (r1) of the occupant side of the intermediate protruding parts can be configured so as to be smaller than the curvature radius (r2) of the occupant side of the central protruding part, while the curvature radius (R) of the occupant side of the side protruding parts can be configured so as to be greater than the curvature radius (r2) of the occupant side of the central protruding part.

By making the curvature radius (r1) of the intermediate protruding parts small, the flexibility (cushioning) of the boundary portions between the front protection part and the side protruding parts increases, allowing the head of the occupant to be gently received when the head moves (slides) toward the side protruding parts in an oblique direction from the front protection part.

On the front protection part, the distance between the first front-rear tethers and the second front-rear tethers may be smaller than the distance between the pair of second front-rear tethers. Furthermore, the first front-rear tethers may be shorter than the second front-rear tethers. With such settings, it is possible to achieve the optimal curvature radii as described above by a relatively simple method.

The connections of the front protection part with the pair of first front-rear tethers can be disposed offset in the vertical direction from the connections thereof with the pair of second front-rear tethers. For example, the connections of the front protection part with the pair of first front-rear tethers can be disposed offset downward from the connections thereof with the pair of second front-rear tethers.

Similarly, on the cross tether, connections with the pair of first front-rear tethers and connections with the pair of second front-rear tethers can be disposed offset from each other in the vertical direction. For example, on the cross tether, the connections with the pair of first front-rear tethers can be disposed offset downward from the connections with the pair of second front-rear tethers.

When the head of the occupant approaches the front protection part from an oblique direction, a head with a large weight typically moves downward (obliquely downward). Thus, for the case in which the first front-rear tethers located on the outer sides are shifted downward, when the head of the occupant slides from the central protruding part toward the side protruding parts, the head of the occupant can surely and gently be received by the intermediate protruding parts formed by the second front-rear tethers located further downward than the first front-rear tethers.

BRIEF DESCRIPTION OF THE DRAWINGS

In FIG. 10, (A) illustrates the initial stage of deployment, while (B) illustrates the deployment behavior of the airbag when the occupant approaches the airbag from the front after the state of (A).

MODE FOR CARRYING OUT THE INVENTION

Occupant airbag devices according to examples of the present invention are described in detail below based on the accompanying drawings. Note that in the examples, while an occupant P is based on an experimental dummy, the same functions will be achieved with an actual occupant.

Figure 1:
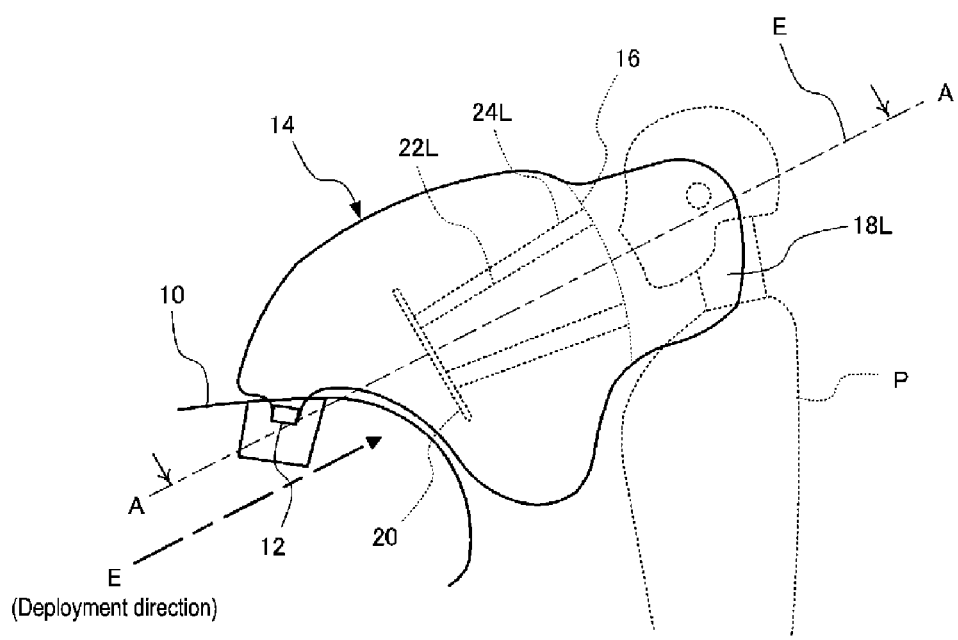
FIG. 1 is a side view illustrating the deployed state of an occupant airbag device according to the present invention.
Figure 1:
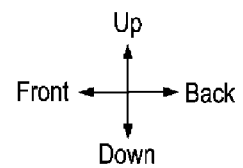
Figure 2:
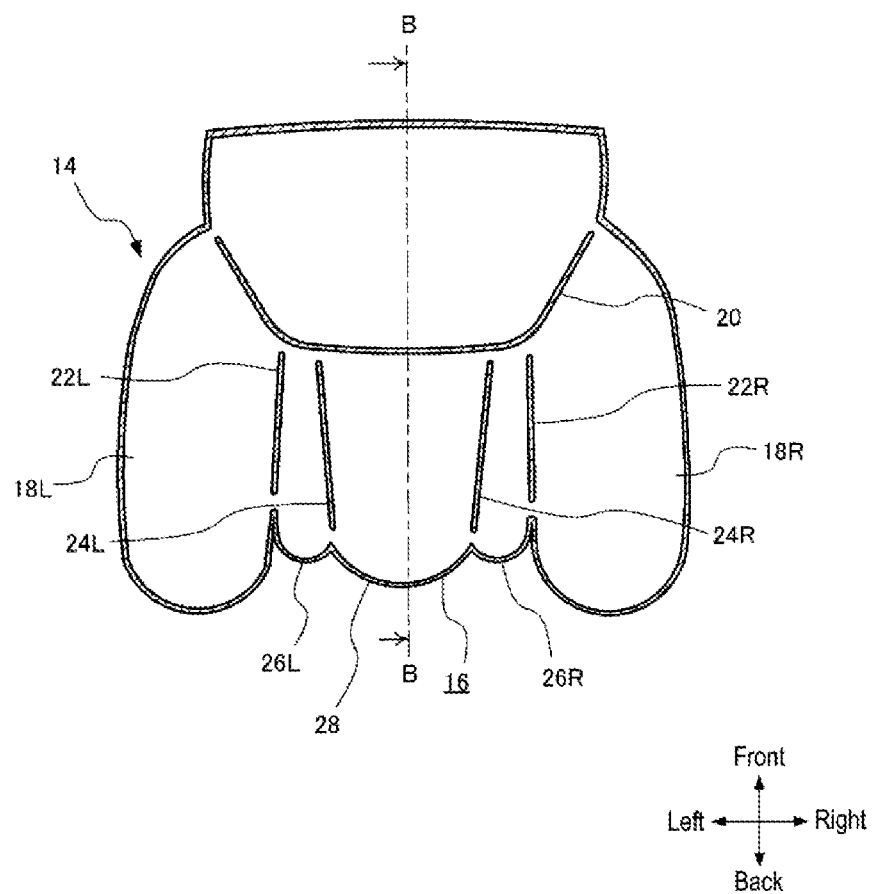
FIG. 2 is a schematic view (cross-sectional view) corresponding to the cross section along line A-A in FIG. 1 and illustrating a configuration of panels and tethers constituting the airbag, wherein the panels and the tethers are spaced from each other at their connections for purpose of convenience.
Figure 3:
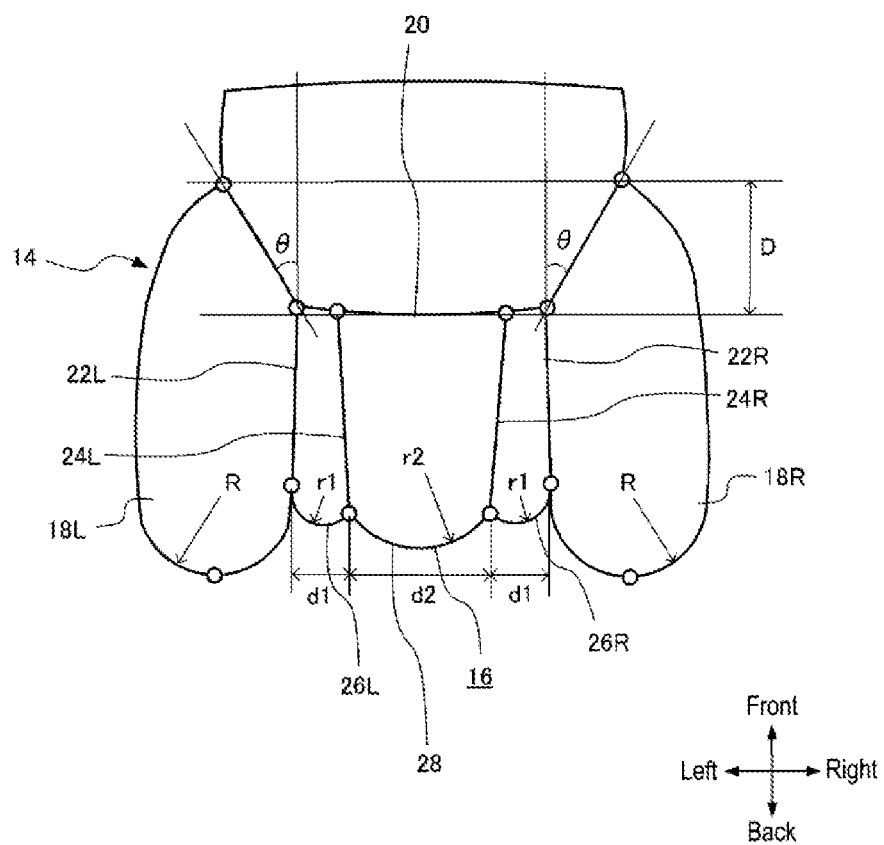
FIG. 3 is a schematic view (cross-sectional view) corresponding to the cross section along line A-A in FIG. 1 similarly to FIG. 2 and illustrating the size, shape, locations of connections, and the like of the panels and the tethers constituting the airbag, wherein the locations of connections and the like between the panels and the tethers are illustrated as circles for purpose of convenience.
Figure 4:
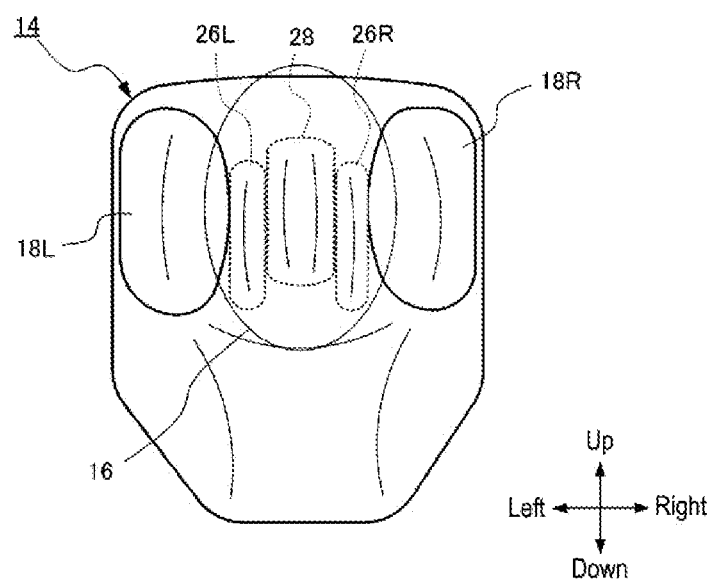
FIG. 4 is a front view illustrating the deployed state of the occupant airbag device according to the present invention and illustrates the state viewed from the occupant side.
Figure 5:
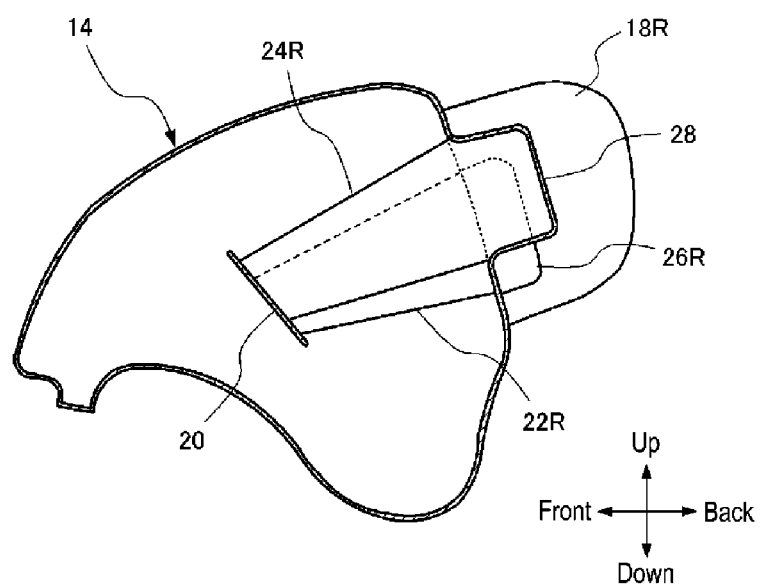
FIG. 5 is a cross-sectional view corresponding to the cross section along line B-B in FIG. 2 and illustrating the deployed shape of the airbag.

FIG. 1 is a side view illustrating the deployed state of an airbag 14 of an occupant airbag device according to examples of the present invention. FIG. 2 is a schematic view corresponding to the cross section along A-A line in FIG. 1 and illustrating a configuration of tethers constituting the airbag 14, wherein the tethers are illustrated spaced at their connections in order to clearly distinguish each member. FIG. 3 is a schematic view corresponding to the cross section along line A-A in FIG. 1 similarly to FIG. 2 and illustrating the size, shape, locations of connections, and the like of panels and the tethers that constitute the airbag 14. In FIG. 3, white circles indicate stitching locations (connections). FIG. 4 is a front view illustrating the deployed state of the airbag 14 and illustrates the state viewed from the occupant side. FIG. 5 is a view corresponding to the cross-section along line B-B in FIG. 2 and illustrating the deployed shape of the airbag 14.

As illustrated in FIG. 1, the airbag device according to examples of the present invention is housed in the instrument panel 10 of a vehicle in order to protect an occupant P in a passenger seat, and includes an inflator 12 for generating inflation gas along with an airbag 14 that inflates and deploys toward the occupant P side via gas released from the inflator 12.

The airbag 14 includes a front protection part 16 located in front of the occupant P when deployed and a pair of side protruding parts 18L, 18R located on the sides of the front protection part 16 in the vehicle width direction and protruding further toward the occupant P side than the front protection part 16 (see FIG. 2).

A cross tether 20 extending in the direction intersecting the deployment direction E of the airbag 14 and connected to the inner surface of the airbag 14 along with a pair of first front-rear tethers 22L, 22R connected to the cross tether 20 at the front ends thereof and connected to the front protection part 16 at the rear ends thereof are provided inside the airbag 14 (see FIG. 2, FIG. 3). The longitudinal direction of the cross tether 20 is preferably a direction orthogonal to the deployment direction E of the airbag 14.

As clearly illustrated in FIG. 3, connections between the rear ends of the first front-rear tethers 22L, 22R and the front protection part 16 are located at boundaries between the front protection part 16 and the side protruding parts 18L, 18R. A pair of second front-rear tethers 24L, 24R are provided inside in the vehicle width direction of the pair of first front-rear tethers 22L, 22R, with the front ends of the second front-rear tethers 24L, 24R connected to the cross tether 20, while the rear ends are connected to the front protection part 16.

Furthermore, on the surface of the front protection part 16, a pair of left and right intermediate protruding parts 26L, 26R protruding toward the occupant P side are formed between the first front-rear tethers 22L, 22R and the second front-rear tethers 24L, 24R. Furthermore, a central protruding part 28 protruding toward the occupant P side is formed between the pair of second front-rear tethers 24L, 24R. Here, the central protruding part 28 protrudes further toward the occupant P side than the intermediate protruding parts 26L, 26R.

Furthermore, as illustrated in FIG. 3, the curvature radius (r1) of the occupant P side of the intermediate protruding parts 26L, 26R is smaller than the curvature radius (r2) of the occupant P side of the central protruding part 28, while the curvature radius (R) of the occupant P side of the side protruding parts 18L, 18R is greater than the curvature radius (r2) of the central protruding part 28.

On the front protection part 16, the distance d1 between the first front-rear tethers 22L, 22R and the second front-rear tethers 24L, 24R is smaller than the distance d2 between the pair of second front-rear tethers 24L, 24R. Here, by making the length in the front-rear direction (longitudinal direction) of the first front-rear tethers 22L, 22R shorter than the length in the front-rear direction (longitudinal direction) of the second front-rear tethers 24L, 24R and adjusting the distances d1, d2 between the tethers on the front protection part 16, optimal curvature radii as described above can be set.

As illustrated in FIG. 2 and FIG. 3, connections between the cross tether 20 and the pair of first front-rear tethers 22L, 22R are configured so as to move further in the occupant direction by a predetermined distance (for example, 125 mm) than the straight line connecting portions at which the both ends of the cross tether 20 are connected to the inner surface of the airbag when the airbag 14 deploys. Note that FIG. 2 and FIG. 3 illustrate the state in which the airbag 14 deploys and pressure is applied in the front-rear direction, that is, the state in which the tension of the first front-rear tethers 22L, 22R and the second front-rear tethers 24L, 24R is maximized, and when the inflation gas subsequently spreads throughout the entire airbag 14, pressure is applied in the left-right direction, such that the shape of the airbag 14 extends in the left-right direction (see FIG. 10(B)).

Referring again to FIG. 3, in the state of maximum tension of the first front-rear tethers 22L, 22R, the angle θ between the direction in which the first front-rear tethers 22L, 22R extend and the direction in which the cross tether 20 extends from the connections between the cross tether 20 and the first front-rear tethers 22L, 22R toward the connections with the inner surface of the air bag 14 is less than or equal to 45°, more preferably 20 to 40°. The angle θ as described above can be matched with the angle at which the occupant approaches in the event of an oblique collision, and by optimally setting this angle θ, the range (margin) in which the airbag expands in the width direction can be ensured to be large when the occupant obliquely approaches the front protection part (and the side protruding parts), improving occupant restraining performance.

Figure 6:
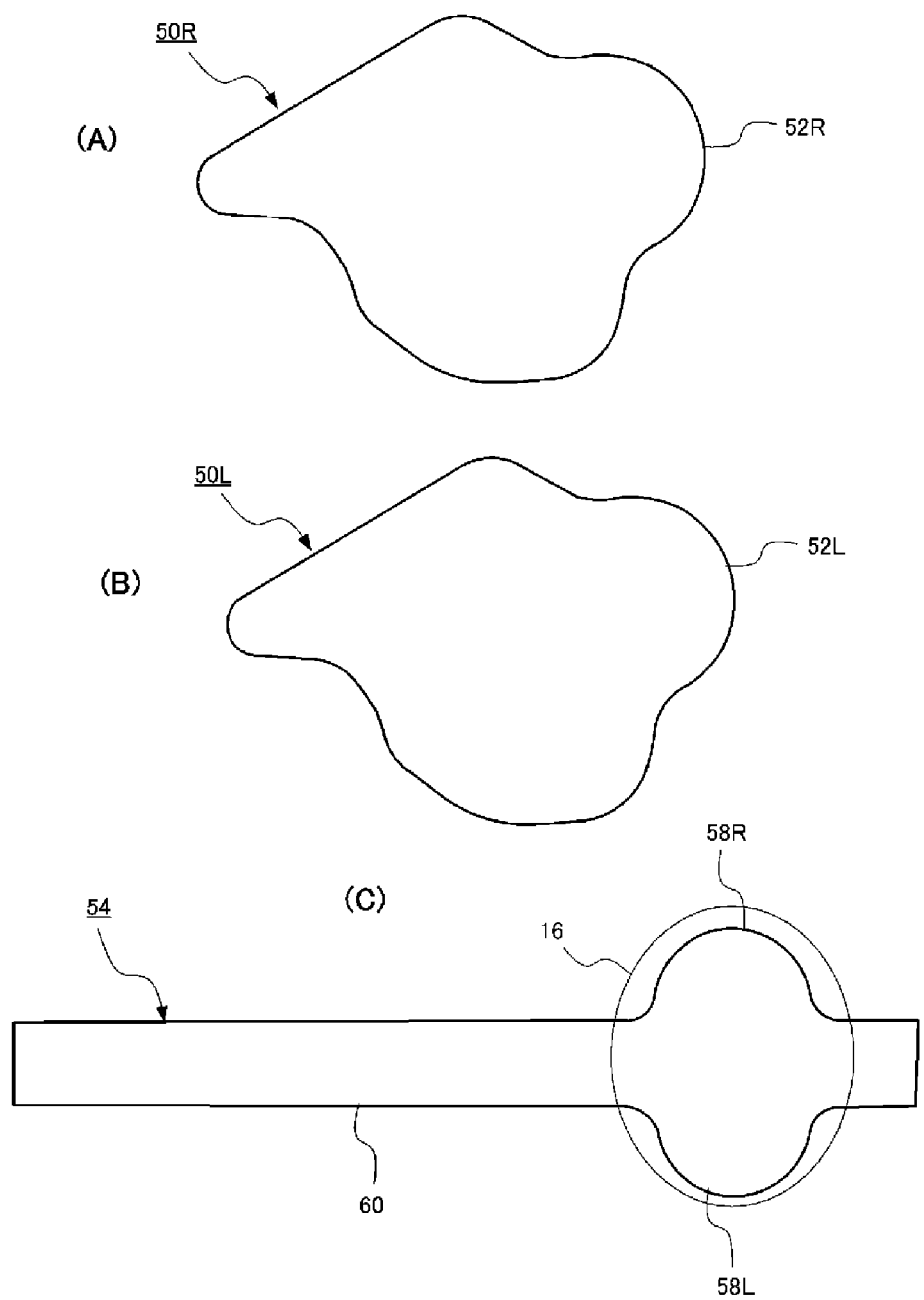
FIG. 6 is a plan view illustrating the shapes of the panels constituting the airbag according to the present invention, wherein (A) and (B) are side panels, while (C) is a front panel.
Figure 7:
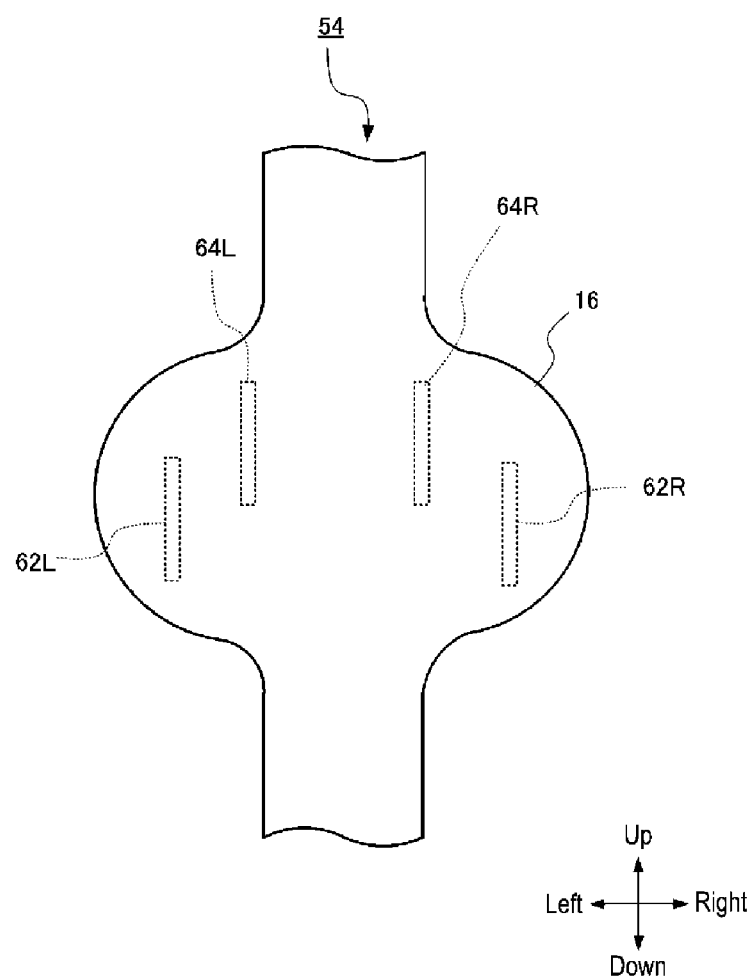
FIG. 7 is a plan view illustrating a portion of the front panel constituting the airbag according to the present invention, wherein the connection locations with the front-rear tethers are indicated by broken lines.

FIG. 6 is a plan view illustrating the shapes of the panels constituting the airbag 14 according to this example, wherein (A) and (B) are side panels 50R, 50L, while (C) is a front panel 54. FIG. 7 is a plan view illustrating a portion of the front panel 54 and illustrates the connection locations with the rear ends of the first and second front-rear tethers 22L, 22R, 24L, 5 24R. Furthermore, FIGS. 8(A), (B), and (C) are plan views illustrating the shape variation of the cross tether 20.

As illustrated in FIG. 6, the airbag 14 according to this example is formed of two side panels 50L, 50R and one center panel 54. The side panels 50L, 50R are panels of the same shape located on both the left and right sides when viewed from the occupant P side and include arc-shaped curved portions 52L, 52R that form the side protruding parts 18L, 18R. Meanwhile, the front panel 54 includes elliptical or generally circular regions 58L, 58R forming the front protection part 16 of the airbag 14, along with a band-like region 60. The arc-shaped curved portions 58L, 58R of the front panel 54 and the curved portions 52L, 52R of the side panels 50L, 50R are connected by stitching, with the other edges of the side panels 50L, 50R connected to both edges of the band-like region 60 of the front panel 54 by stitching.

As illustrated in FIG. 7, the connections (stitching locations) of the first front-rear tethers 22L, 22R with the front protection part 16 of the front panel 54 are 62L and 62R, while the connections (stitching locations) of the second front-rear tethers 24L, 24R are 64L and 64R. In this example, while all of the connections 62L, 62R, 64L, 64R are arranged in parallel and are bilaterally symmetric, these connections do not need to be perfectly parallel and may be disposed or shaped so as to be wider at the upper or lower ends, such as in an inverted V shape.

In FIG. 7, it is important that the connections 62L, 62R with the first front-rear tethers 22L, 22R be disposed offset downward from the connections 64L, 64R with the second front-rear tethers 24L, 24R.

Figure 8:
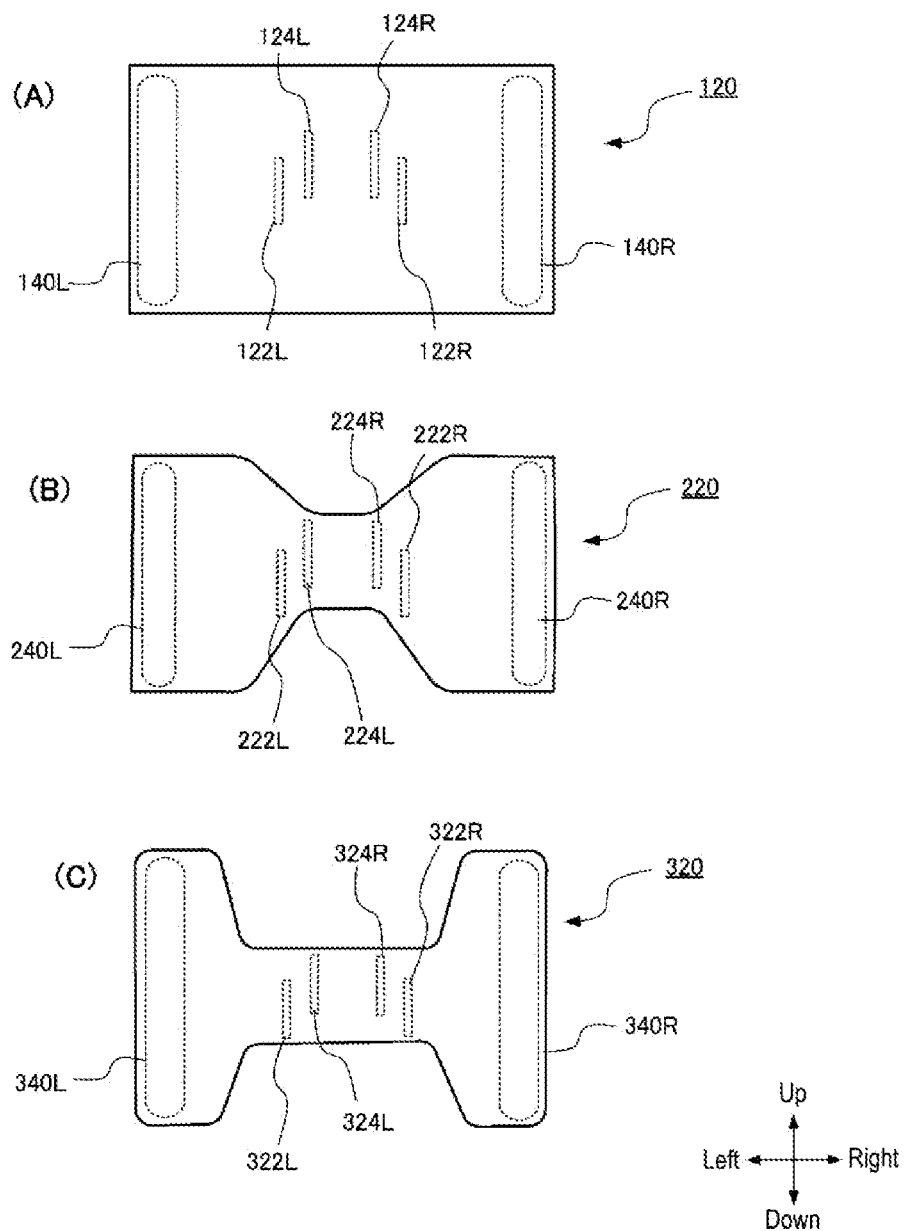
FIGS. 8(A), (B), and (C) are plan views illustrating examples of the cross tether connected to the inside of the airbag according to the present invention.

As illustrated in FIG. 8, various variations can be employed in the shape of the cross tether 20, with, for example, a simple rectangular-shaped cross tether 120 as illustrated in (A) and "H"-shaped cross tethers 220, 320 as illustrated in (B) and (C) capable of being employed. Note that the shapes of the cross tether 20, 120, 220, 320 illustrated in FIG. 8 are viewed from the occupant side in the extending direction of the first front-rear tethers 22L, 22R (or in the deployment direction E of the airbag).

In the cross tether 120 illustrated in FIG. 8(A), both ends 140L, 140R in the longitudinal direction are stitched to the inner surface of the airbag 14 (the side panels 50L, 50R), the front ends of the first front-rear tethers 22L, 22R are stitched to regions 122L, 122R, and the front ends of the second front-rear tethers 24L, 24R are stitched to regions 124L, 124R.

In the cross tether 220 illustrated in FIG. 8(B), both ends 240L, 240R in the longitudinal direction are stitched to the inner surface of the airbag 14 (the side panels 50L, 50R), the front ends of the first front-rear tethers 22L, 22R are stitched to regions 222L, 222R, and the front ends of the second front-rear tethers 24L, 24R are stitched to regions 224L, 224R.

In the cross tether 320 illustrated in FIG. 8(C), both ends 340L, 340R in the longitudinal direction are stitched to the inner surface of the airbag 14 (the side panels 50L, 50R), the front ends of the first front-rear tethers 22L, 22R are stitched to regions 322L, 322R, and the front ends of the second front-rear tethers 24L, 24R are stitched to regions 324L, 324R.

As illustrated in FIGS. 8(A) to (C), similar to the case of the front protection part 16 (FIG. 7), on the cross tether 20, 120, 220, 320 as well, the connections 122L, 122R, 222L, 222R, 324L, 324R with the first front-rear tethers 22L, 22R are disposed slightly offset downward relative to the connections 124L, 124R, 224L, 224R, 324L, 324R with the second front-rear tethers 24L, 24R.

Figure 9:
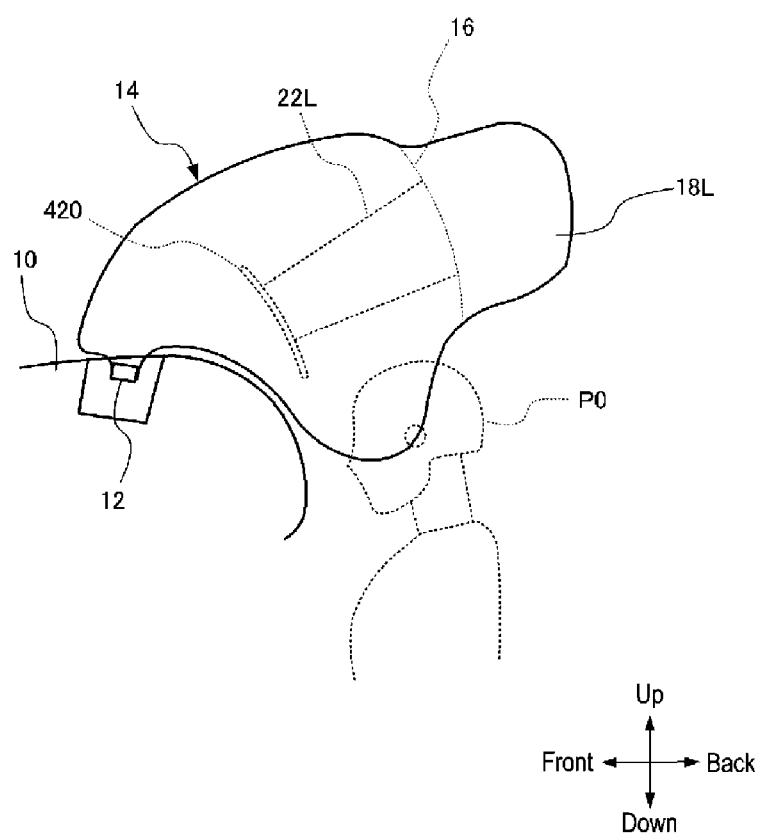
FIG. 9 is a side view illustrating the deployed state of the occupant airbag device according to another example of the present invention and illustrates the positional relationship between an occupant located in OOP and the cross tether.

FIG. 9 is a side view illustrating the deployed state of the occupant airbag device according to another example of the present invention and illustrates the positional relationship between the occupant P0 out of position (OOP) and the cross tether 420. In this example, the cross tether 420 is disposed at a location away from the head of the occupant P0 in OOP, for example, in front of the head of the occupant P0, and is disposed at a location spaced upward.

Furthermore, the cross tether 420 is disposed so as to cover a portion of the instrument panel 10 when the inside of the airbag 14 deployed is viewed from the occupant side in the extending direction of the first and second front-rear tethers 22L, 22R, 24L, 24R. Furthermore, the cross tether 420 is configured so as to be convex toward the occupant P0 side when the inside of the airbag 14 is viewed from the side (FIG. 9). Note that the extending direction of the first and second front-rear tethers can generally be matched with the deployment direction E of the airbag.

Operation of Examples

Figure 10:
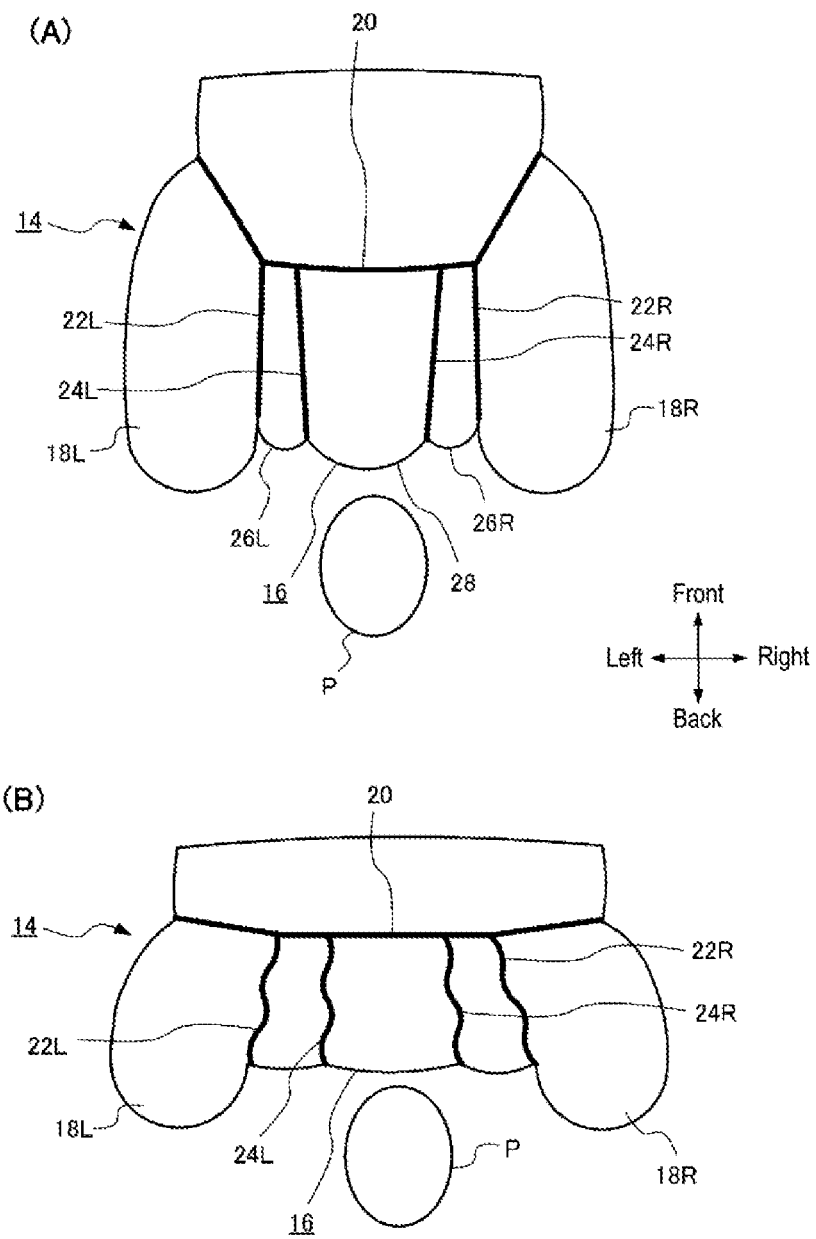
FIG. 10 is a schematic view illustrating the deployed state of the occupant airbag device according to the present invention and corresponds to the cross section along line A-A in FIG. 1.
Figure 11:
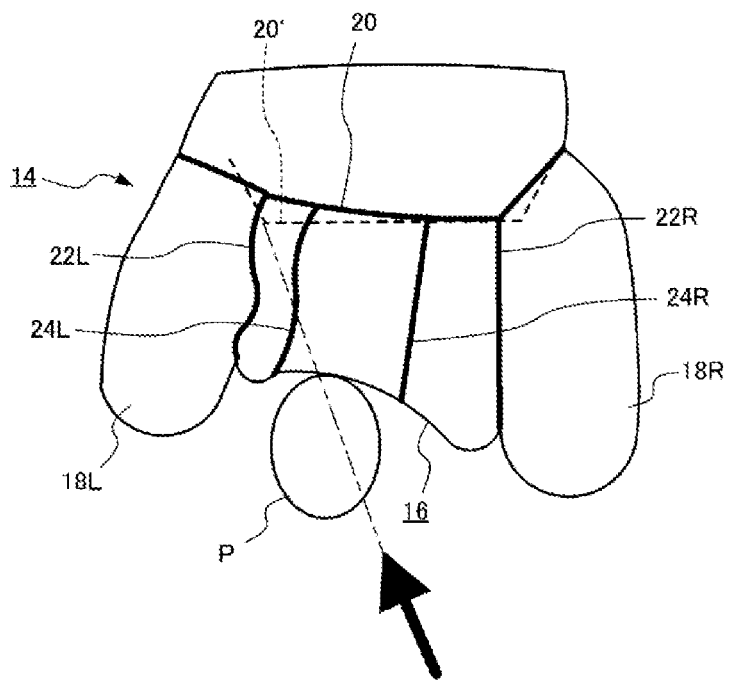
FIG. 11 is a schematic view illustrating the deployed state of the occupant airbag device according to the present invention and corresponding to the cross section along line A-A in FIG. 1 and illustrates the deployment (deformation) behavior of the airbag when the occupant approaches the airbag in a diagonal direction (oblique direction).
Figure 11:
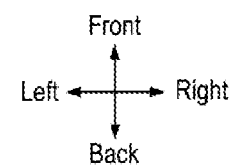

The overall operation of examples of the present invention is described below with reference to FIG. 10 and FIG. 11. FIG. 10 is a schematic view illustrating the deployed state of the airbag 14 and corresponds to the cross section along A-A line in FIG. 1. In FIG. 10, (A) illustrates the initial stage of deployment, while (B) illustrates the deployment behavior of the airbag 14 when the occupant P approaches the airbag 14 from the front after the state of (A). Meanwhile, FIG. 11 illustrates the deployment (deformation) behavior of the airbag 14 when the occupant P approaches the airbag 14 in a diagonal direction (oblique direction).

When the airbag 14 deploys due to a vehicle collision, in the initial stage, as illustrated in FIG. 10(A), inflation gas causes tension in the front-rear direction (deployment direction) to be applied to the first and second front-rear tethers 22L, 22R, 24L, 24R, and the front protection part 16 is attracted toward the vehicle front (the inflator side) at the connections with the first and second front-rear tethers 22L, 22R, 24L, 24R. This causes the connections with the first and second front-rear tethers 22L, 22R, 24L, 24R to be recessed when viewed from the occupant P side, with protrusions 26L, 26R, 28 formed between the recessed portions. These protrusions 26L, 26R, 28 can soften the surface of the front protection part 16 and gently receive the head of the occupant P, consequently mitigating the impact on the head of the occupant and preventing the turning of the head of the occupant.

Thereafter, when the inflation gas spreads throughout the entire airbag 14, the tension in the front-rear direction of the first and second front-rear tethers 22L, 22R, 24L, 24R decreases, while the tension of the front protection part 16 increases. At this time, since the front ends of the first and second front-rear tethers 22L, 22R, 24L, 24R are connected to the cross tether 20, the front-rear tethers are drawn frontward by the cross tether while the airbag 14 is deploying in the left-right width direction and a time difference occurs until the protrusions 26L, 26R, 28 fully extend in the width direction, extending the time to maintain the shapes of the protrusions 26L, 26R, 28, although in a short period of time.

In particular, the cross tether 20 that has moved in the occupant P direction as illustrated in FIG. 10(A) subsequently exhibits a behavior of returning frontward as a reaction, as illustrated in FIG. 10(B). Consequently, while the airbag 14 is deploying in the left-right width direction, a long distance can be ensured for the first and second front-rear tethers 22L, 22R, 24L, 24R to be drawn frontward by the cross tether 20, enabling further lengthening of the time in which the shapes of the protrusions formed between the front-rear tethers are maintained.

Oblique Collision

Note that while FIG. 10(B) illustrates the state in which the occupant P approaches the airbag 14 (the front protection part 16) from the front, for the case in which the occupant P approaches the airbag 14 in a diagonal direction (oblique direction), the deployment (deformation) behavior of the airbag 14 is as illustrated in FIG. 11.

In this example, since the angle θ formed by the first front-rear tethers 22L, 22R and the front portion of the cross tether is set to 45° or less, as also illustrated in FIG. 3, when the occupant P approaches the front protection part 16 (and the side protruding parts 18L, 18R), the range (margin) in which the airbag 14 extends in the width direction can assuredly be made large.

Furthermore, as also illustrated in FIG. 4, the first front-rear tethers 22L, 22R located on the outer side are offset further downward than the second front-rear tethers 24L, 24R located on the inner side, such that the intermediate protruding parts 26L, 26R are formed further downward than the central protruding part 28. Consequently, when the head of the occupant P approaches the front protection part 16 in an oblique direction and the head of the occupant P slides from the central protruding part 28 toward the side protruding part 18L, the head of the occupant P can be gently received by the intermediate protruding part 26L present further downward than the central protruding part 28. Note that while FIG. 11 illustrates the case in which the occupant P approaches in an obliquely left front direction, it goes without saying that the same applies to the case of approaching in a right front direction.

Interpretation of the Technical Scope of the Present Invention

Examples of the present invention have been described above; however, the present invention is not limited in any way to the examples described above and can be changed as appropriate within the scope of the technical idea as that defined in the claims.

The invention claimed is:

1. An airbag device housed in an instrument panel of a vehicle in order to protect an occupant in a passenger seat, the airbag device comprising:
    an inflator for generating inflation gas; and
    an airbag that inflates and deploys toward an occupant side via gas released from the inflator;
    the airbag having a front protection part located in front of the occupant when deployed and a pair of side protruding parts located on the sides of the front protection part in a vehicle width direction and protruding further to the occupant side than the front protection part;
    a cross tether extending in a direction intersecting a deploying direction of the airbag and connected to the inner surface of the airbag;
    a pair of first front-rear tethers connected to the cross tether at front ends thereof and connected to the front protection part at rear ends being provided in the inside of the airbag; and
    a pair of second front-rear tethers connected to the cross tether at the front ends thereof and connected to the front protection part at rear ends thereof being provided in the inside of the airbag, wherein the connections of the front protection part with the pair of first front-rear tethers are disposed offset in a vertical direction from the connections thereof with the pair of second front-rear tethers.

2. The airbag device according to claim 1, wherein connections between the rear ends of the first front-rear tethers and the front protection part are located at boundaries between the front protection part and the side protruding parts.

3. The airbag device according to claim 1, configured such that, when the air bag deploys, a portion between the connections of the cross tether with the pair of first front-rear tethers moves further in an occupant direction by a predetermined distance than a line connecting portions at which both ends of the cross tether are connected to the inner surface of the airbag.

4. The airbag device according to claim 1, configured such that, in a state of maximum tension of the first front-rear tethers, an angle between a direction in which the first front-rear tethers extend and the direction in which the cross tether extends from the connections between the cross tether and the first front-rear tethers toward connections with the inner surface of the air bag is less than or equal to 45°.

5. The airbag device according to claim 4, wherein the angle is 20 to 40°.

6. The airbag device according to claim 1, wherein when the inside of the airbag deployed is viewed from the occupant side in an extending direction of the first front-rear tethers, the cross tether is disposed so as to cover a portion of the instrument panel.

7. The airbag device according to claim 6, wherein when the inside of the airbag deployed is viewed from sideward, the cross tether is convex toward the occupant side.

8. The airbag device according to claim 1, wherein when viewed from the occupant side in an extending direction of the first front-rear tethers, the cross tether is formed into an alphabet H-shape with the vehicle width direction as a lateral direction.

9. The airbag device according to claim 1, wherein when viewed from the occupant side in an extending direction of the first front-rear tethers, the cross tether is formed into a rectangular shape with the vehicle width direction as a longitudinal direction.

10. The airbag device according to claim 1, wherein:
    in the front protection part located between the pair of side protruding parts, a pair of left and right intermediate protruding parts protruding toward the occupant side are formed between the first front-rear tethers and the second front-rear tethers; and
    a central protruding part protruding toward the occupant side is formed between the pair of second front-rear tethers.

11. The airbag device according to claim 10, wherein the central protruding part protrudes farther toward the occupant side than the intermediate protruding parts.

12. The airbag device according to claim 11, configured such that the radius of curvature (r1) of the occupant side of the intermediate protruding parts is smaller than the radius of curvature (r2) of the occupant side of the central protruding part.

13. The airbag device according to claim 12, wherein the radius of curvature (R) of the occupant side of the side protruding parts is greater than the radius of curvature (r2) of the occupant side of the central protruding part.

14. The airbag device according to claim 1, wherein on the front protection part, a distance between the first front-rear tethers and the second front-rear tethers is smaller than a distance between the pair of second front-rear tethers.

15. The airbag device according to claim 1, wherein the first front-rear tethers are set shorter than the second front-rear tethers.

16. The airbag device according to claim 1, wherein the connections of the front protection part with the pair of first front-rear tethers are disposed offset downward from the connections thereof with the pair of second front-rear tethers.

17. The airbag device according to claim 1, wherein on the cross tether, connections with the pair of first front-rear tethers and connections with the pair of second front-rear tethers are disposed offset from each other in the vertical direction.

18. The airbag device according to claim 17, wherein on the cross tether, the connections with the pair of first front-rear tethers are disposed offset downward from the connections with the pair of second front-rear tethers.

19. An airbag device housed in an instrument panel of a vehicle in order to protect an occupant in a passenger seat, the airbag device comprising:
   an inflator for generating inflation gas; and
   an airbag that inflates and deploys toward an occupant side via gas released from the inflator;
   the airbag having a front protection part located in front of the occupant when deployed and a pair of side protruding parts located on the sides of the front protection part in a vehicle width direction and protruding further to the occupant side than the front protection part;
   a cross tether extending in a direction intersecting a deploying direction of the airbag and connected to the inner surface of the airbag;
   a pair of first front-rear tethers connected to the cross tether at front ends thereof and connected to the front protection part at rear ends being provided in the inside of the airbag; and
   a pair of second front-rear tethers connected to the cross tether at the front ends thereof and connected to the front protection part at rear ends thereof being provided in the inside of the airbag, wherein on the cross tether, connections with the pair of first front-rear tethers and connections with the pair of second front-rear tethers are disposed offset from each other in the vertical direction.

20. An airbag device housed in an instrument panel of a vehicle in order to protect an occupant in a passenger seat, the airbag device comprising:
   an inflator for generating inflation gas; and
   an airbag that inflates and deploys toward an occupant side via gas released from the inflator;
   the airbag having a front protection part located in front of the occupant when deployed and a pair of side protruding parts located on the sides of the front protection part in a vehicle width direction and protruding further to the occupant side than the front protection part;
   a cross tether extending in a direction intersecting a deploying direction of the airbag and connected to the inner surface of the airbag;
   a pair of first front-rear tethers connected to the cross tether at front ends thereof and connected to the front protection part at rear ends being provided in the inside of the airbag; and
   a pair of second front-rear tethers connected to the cross tether at the front ends thereof and connected to the front protection part at rear ends thereof being provided in the inside of the airbag, wherein the first front-rear tethers are set shorter than the second front-rear tethers.

* * * * *